March 14, 1950 S. LE VINE 2,500,838

TELEPHONE PENCIL HOLDER

Filed May 1, 1947 2 Sheets-Sheet 2

INVENTOR.
SAUL LEVINE.

BY Robert A. Sloman
ATTORNEY.

March 14, 1950 S. LE VINE 2,500,838

TELEPHONE PENCIL HOLDER

Filed May 1, 1947 2 Sheets-Sheet 1

INVENTOR.
SAUL LE VINE

BY Robert A. Sloman
ATTORNEY.

Patented Mar. 14, 1950 2,500,838

UNITED STATES PATENT OFFICE 2,500,838

TELEPHONE PENCIL HOLDER

Saul Le Vine, Detroit, Mich.

Application May 1, 1947, Serial No. 745,162

1 Claim. (Cl. 248—305)

This invention relates to a pencil holder for a telephone, and more particularly to a pair of spaced pencil supporting members adapted for mounting upon the conventional mouth and ear piece support of a dial telephone.

It is the object of this invention to construct a pencil holder for a telephone employing a pair of pencil supporting elements adapted to retainingly support a pencil in horizontal position.

It is the object of this invention to provide a pair of elements which are formed to horizontally support a pencil with the common base portion for said elements adapted for mounting over and upon the conventional receiver support of a dial telephone.

It is the still further object of this invention to provide a horizontally arranged supporting clip for a pencil with the base of said clip adapted for mounting over and upon the telephone receiver support.

These and other objects will be seen from the following specification and claim in conjunction with the appended drawing in which:

It will be understood that the above drawing illustrates merely a preferable embodiment of the invention, and that other embodiments are contemplated within the scope of the claim hereafter set out.

Figure 1:
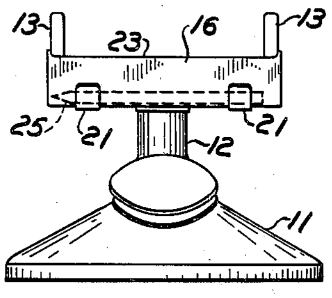
Figure 1 is a front elevational view of the pencil supporting clip mounted upon a dial telephone.
Figure 2:
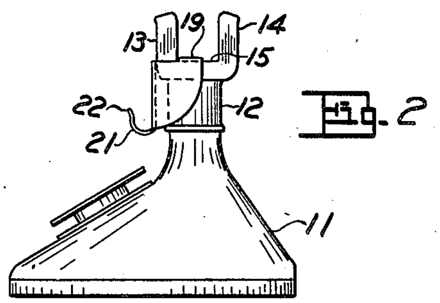
Figure 2 is a side elevational view thereof.

Referring to the drawing, a dial telephone is illustrated in Figures 1 and 2 with base 11, pedestal 12 and the upwardly bifurcated mouth and ear piece retaining elements 13 and 14.

The telephone receiver is adapted for mounting upon the transverse support 15 at the top of pedestal 12.

A pair of bifurcated elements 13 and 14 are arranged in spaced relation at opposite ends of support 15 to effectively retain the telephone receiver, not shown, in position.

As illustrated in the drawing, the pencil supporting clip consists of the substantially flat base element 16 preferably constructed of light gage spring steel, which assumes a vertical position when mounted upon the telephone.

A pair of end walls, 17 and 18 are provided at opposite ends of base 16 with said walls projecting rearwardly at right angles thereto and forming an integral part thereof.

A pair of clip supporting ears 19 project horizontally inward from the outer portions of walls 17 and 18, being arranged in spaced relation from the rear wall of said base providing slots 20 therebetween.

Figure 4:
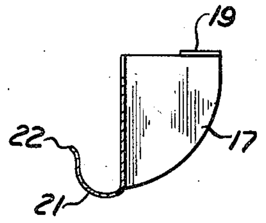
Figure 4 is an elevational section on line 4—4 Fig. 3.

Elements 19 form an integral part of end walls 17 and 18, being bent down and inwardly so as to extend normally thereto. As illustrated in Figures 2 and 4 end walls 17 and 18 are in the preferable form of a 90 degree sector of an ellipse or circle.

A pair of spaced pencil supporting elements 21 project outwardly from the lower edge of base 11 and curve upwardly, terminating in the outwardly extending lip 22 to facilitate the insertion of pencil 25 therein. Elements 21 are resilient to effectively retain the pencil against accidental dislodgement.

Figure 3:
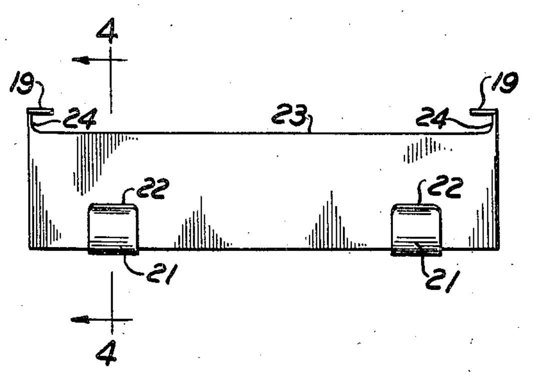
Figure 3 is a front elevational view of the clip.
Figure 5:
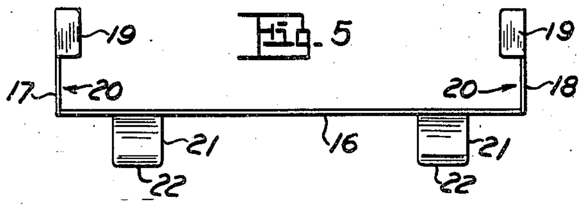
Figure 5 is a top plan view of the clip.

As shown in Figures 1 and 3 the top edge 23 of base 16 is lower than the top edges of end walls 17 and 18 throughout its length, with its end portions 24 curving upwardly joining members 17 and 18 at their top edges.

The pencil supporting clip is mounted upon the telephone so that the receiver retaining elements 13 cooperatively project up through the slots 20 formed in said clip. The ears 19 project between receiver retaining elements 13 and 14, and are mounted upon support 15, so that said clip assumes the position shown in Figure 2.

End walls 17 and 18 are spaced apart sufficiently to frictionally bear against and embrace the outside walls of elements 13. At the same time the opposite edges of said elements cooperatively and frictionally bear against the rear wall of base 16 and the inner edges of ears 19 respectively.

The pencil supporting clip being constructed of a light gage spring steel, it is seen that the pencil retaining elements 21 will resiliently support and engage pencil 25 Figure 1 against accidental dislodgement.

At the same time end walls 17 and 18 are of sufficient resiliency to effectively retain the clip in cooperating engagement with the telephone receiver support 15 and relatively immovable thereon.

While a pair of pencil supporting elements 21 are shown in the drawing, it is contemplated that one thereof could be eliminated, employing merely a central pencil supporting element.

It is further contemplated that element 21 may be unitary with the material of the clip interconnecting the inner side walls of elements 21 to form one continuous pencil supporting element.

Figure 6:
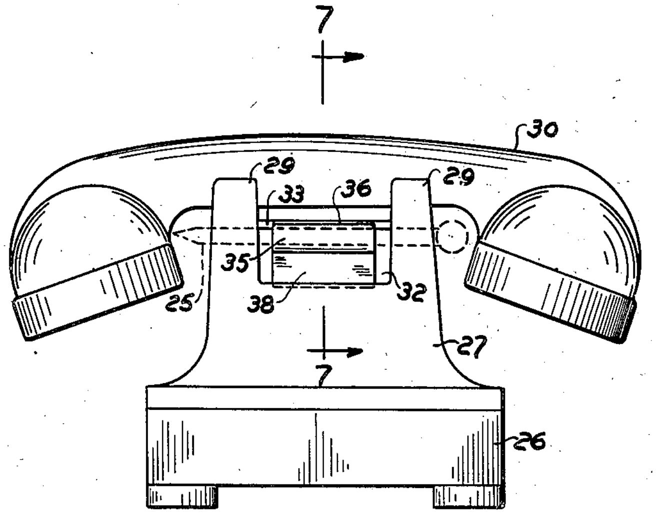
Figure 6 is a front elevational view of a different form of pencil supporting clip mounted upon the rear portion of the box type dial telephone.
Figure 7:
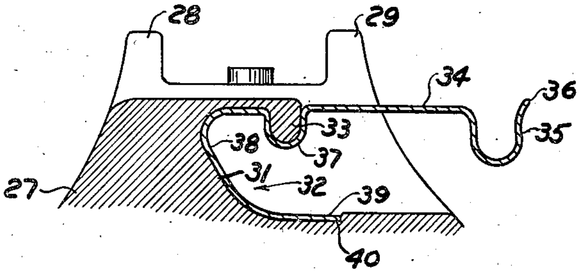
Figure 7 is a fragmentary elevational section thereof on line 7—7 of Figure 6.

Figures 6 and 7 illustrate the other conventional box type telephone with rectangular base 26 having a formed pedestal 27 thereon.

The upper portion of said pedestal terminates in the spaced upwardly extending bifurcations 28, 29. Receiver 30 is mounted upon pedestal 27 between said bifurcations.

The rear portion of pedestal 27 is under cut at 31 providing the recess 32. The horizontally extending downwardly projecting ridge 33 extends across the top rear portion of said recessed portion forming an integral part of said pedestal. This is the conventional construction of dial telephone of the hollow rectangular box type which forms no part of the present invention.

The clip 16, 22 shown in Figures 1 through 5 is particularly adaptable to the round base type telephone, however, its base must be differently shaped for use in conjunction with the type of dial telephone in Figures 6 and 7.

Referring to Figures 6 through 9 the pencil holding clip consists of the outwardly projecting element 34 having at its outer end the substantially concave pencil supporting element 35. The latter terminates in the outwardly curved lip 36 to facilitate the entry of the pencil 25. Said clip is constructed of a relatively light gage spring steel, and portion 35 is so formed as to resiliently engage and receive the pencil shank to prevent accidental dislodgement thereof.

The inner end of clip element 34 has a transverse concave formed portion 37 which terminates in the clip retaining element 38. The latter is shaped similarly to the formed recess 31, 32 in the rear portion of pedestal 27, and is adapted to cooperatively fit therein. Concave portion 37 is shaped similarly to the outer portions of ridge 33 and cooperatively projects around the same, whereby said clip is effectively retained in position within recess 32.

The outer end 39 forming a part of retaining element 38 cooperatively bears within the notched portion 40 in the rear part of pedestal 27.

The clip as a whole is easily inserted and retained within the pedestal recess 32, and may be removed by an upward tipping movement of clip element 34.

Figure 9:
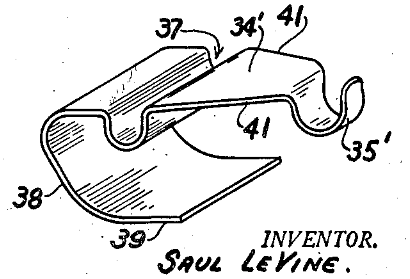
Figure 9 is a perspective view of a slight variation thereof.

A slight variation is shown in Figure 9 wherein the clip element 34' is tapered and has the inwardly converging edges 41.

Figure 8:
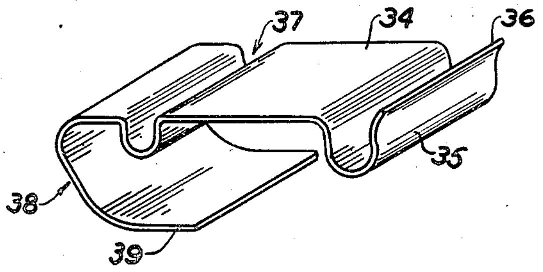
Figure 8 is a perspective view of the pencil supporting clip.

Thus the outwardly projecting clip element 34' terminates in the concave pencil supporting element 35' which is narrower than the similar element 35 shown in Figure 8 but which will effectively support and retain pencil 25 shown in Figure 6.

Having described my invention, reference should now be had to the claim which follows for determining the scope thereof.

I claim:

A pencil holder for a telephone having a horizontal receiver support and upright receiver retaining bifurcated elements at its opposite ends, consisting of a clip having an upright base positioned in front of said support, upright rearwardly extending members at its ends to cooperatively embrace the ends of said receiver support, inwardly projecting horizontally extending clip supporting tabs on said end members spaced from said base and mounted upon said support within said bifurcated elements, and a pair of spaced substantially concave pencil supporting elements projecting forwardly outward from the lower end of said base, the spaced relation of said tabs to said base providing slots to cooperatively receive the front pair of said receiver retaining elements.

SAUL LE VINE.

REFERENCES CITED

The following references are of record in the file of this patent:

UNITED STATES PATENTS

| Number | Name | Date |
|---|---|---|
| 1,632,537 | Brigel | June 14, 1927 |
| 1,983,443 | Duciska et al. | Dec. 4, 1934 |